Feb. 21, 1928. 1,659,866

G. FORNACA

AUTOMATIC SYSTEM FOR COOLING INTERNAL COMBUSTION ENGINES

Filed April 21, 1926

Inventor
Guido Fornaca
By [signature] Atty.

Patented Feb. 21, 1928.

1,659,866

UNITED STATES PATENT OFFICE.

GUIDO FORNACA, OF TURIN, ITALY.

AUTOMATIC SYSTEM FOR COOLING INTERNAL-COMBUSTION ENGINES.

Application filed April 21, 1926, Serial No. 103,562, and in Italy April 24, 1925.

The object of this invention is to provide an improved means for cooling the internal combustion engine of a motor vehicle, particularly a railroad motor car.

To the attainment of this object the engine is, in accordance with the present invention, surrounded by a casing that forms a chamber open below and communicating above with a chimney; the chimney preferably encloses the engine exhaust pipe and the fuel tanks.

Owing to this arrangement an ascending air draught is created naturally, and this draught is augmented if the engine exhaust pipe is enclosed by the chimney.

The draught can also be increased by locating the engine flywheel at the base of the chimney.

As the means takes up little room it is suitable for railroad motor cars or the like where the space to be left free for passengers must be as great as possible.

By way of example, one constructional form of the device as applied to a railroad motor car engine, is illustrated on the accompanying drawing.

Figure 1:
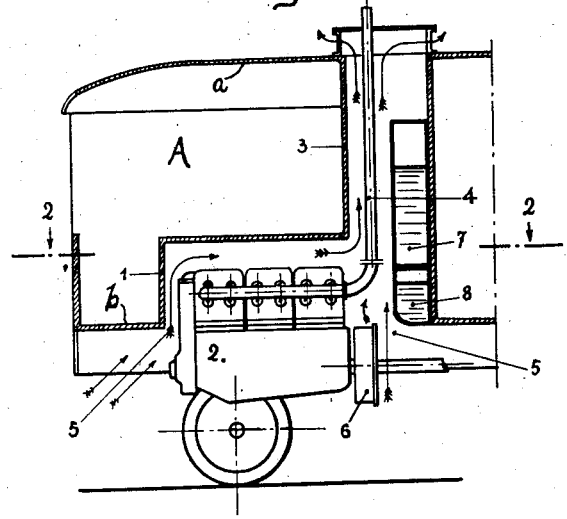
Figure 2:
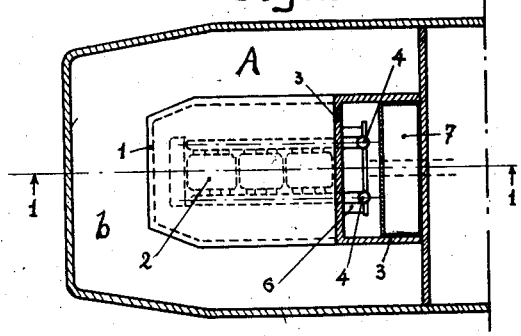

Figure 1 is a longitudinal vertical section and Figure 2 a plan, partly in section, through the engine cab.

In the drawing, A designates the cab or front portion of the body of a motor vehicle or van having a top or roof $a$, and in the floor portion $b$ rising above the latter, is a casing 1, preferably of sheet metal. The top portion of this casing constitutes a support for the seat of the operator, and primarily said casing forms a chamber or housing in which the motor unit, preferably a water cooled combustion engine 2 of the vehicle is mounted. The rear end portion of the casing extends upward through the roof of the cab and constitutes a chimney 3 communicating with said chamber and forms a rest for the back of the operator and a housing for the engine exhaust pipe 4, which extends through the top of the chimney. The casing is open at the bottom and is of sufficient size to leave air spaces 5, 5, for the free passage of cooling air around all sides and over the top of the engine. The fly wheel 6 of the engine being located at the base of the chimney will, together with the heat from the exhaust pipe 3, augment the movement of the air which movement is indicated by the arrows. Tanks 7 and 8 for the fuel and lubricant respectively are also conveniently located within the chimney and are thereby maintained at an even temperature which is beneficial to the operation of the engine.

What I claim is:

1. A motor vehicle comprising a covered cab portion, a casing mounted in the bottom thereof forming a chamber opening at the bottom, said casing having a rear portion forming a chimney communicating with the chamber and extending through the top of the cab, and a motor unit mounted in said chamber.

2. A motor vehicle comprising a covered cab portion, a casing mounted in the bottom thereof forming a chamber opening at the bottom, said casing having a rear portion forming a chimney communicating with the chamber and extending through the top of the cab, a motor unit mounted in said chamber, and having its exhaust pipe extending through the top of the chimney.

3. A motor vehicle comprising a covered cab portion, a casing mounted in the bottom thereof forming a chamber opening at the bottom, said casing having a rear portion forming a chimney communicating with the chamber and extending through the top of the cab, a motor unit mounted in said chamber, having its exhaust pipe extending through the top of the chimney, and a flywheel on the motor unit at the base of the chimney.

4. A motor vehicle comprising a covered cab portion, a casing extending upward from the bottom of the latter forming a seat support and constituting a chamber open at the bottom, said casing having a rear perpendicular portion, extending through the roof of the cab forming a back rest and constituting a chimney communicating with the chamber at its rear end, a water cooled combustion engine mounted in the chamber, the exhaust pipe of said engine extending through the top of the chimney, a fly wheel on the rear of the engine at the base of the chimney to facilitate the movement of the air in the latter, and fuel and lubricant receptacles mounted in the chimney to maintain the contents of the receptacles at an even temperature.

In testimony that I claim the foregoing as my invention, I have signed my name.

GUIDO FORNACA.